No. 890,054. PATENTED JUNE 9, 1908.
W. HOLDSWORTH.
GILL BOX AND GILL DRAWING FRAME.
APPLICATION FILED MAY 7, 1907.
2 SHEETS—SHEET 1.
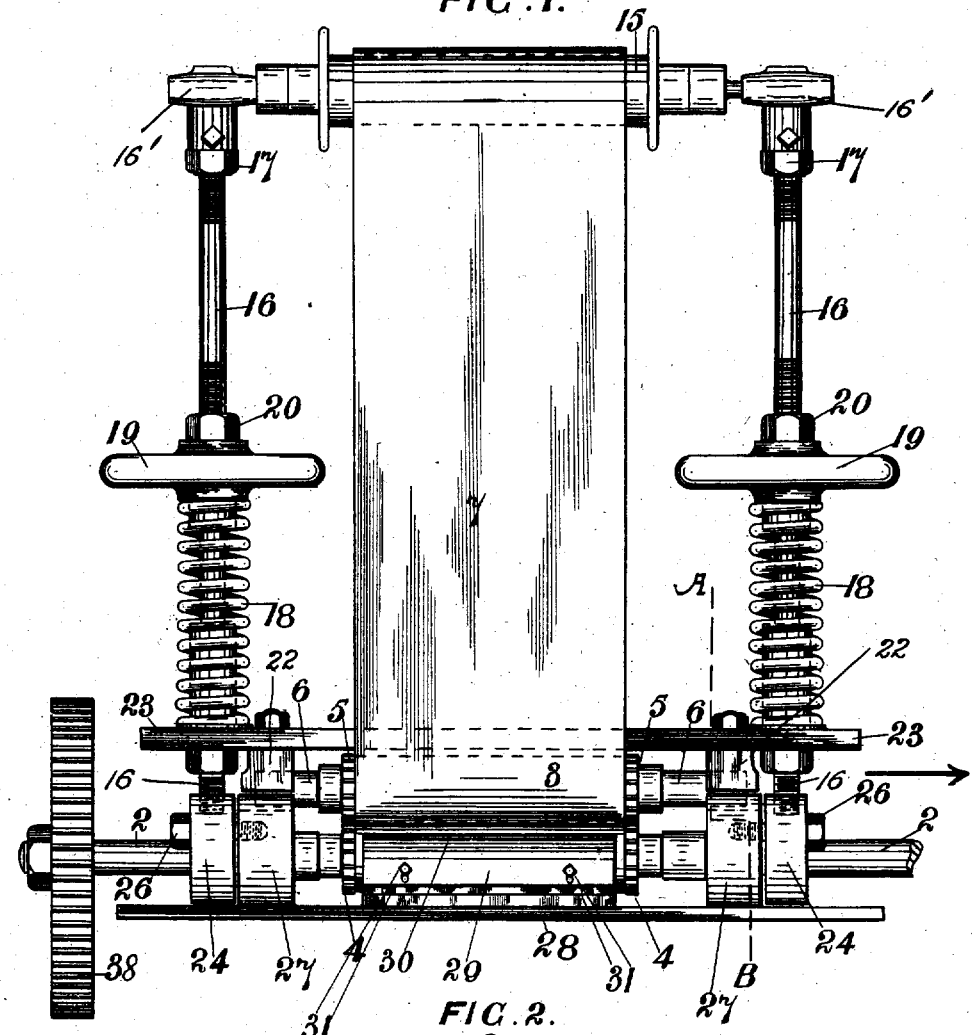
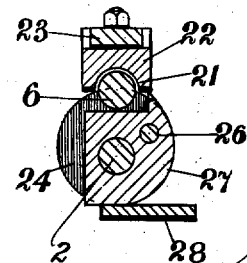

No. 890,054. PATENTED JUNE 9, 1908.
W. HOLDSWORTH.
GILL BOX AND GILL DRAWING FRAME.
APPLICATION FILED MAY 7, 1907.
2 SHEETS—SHEET 2.
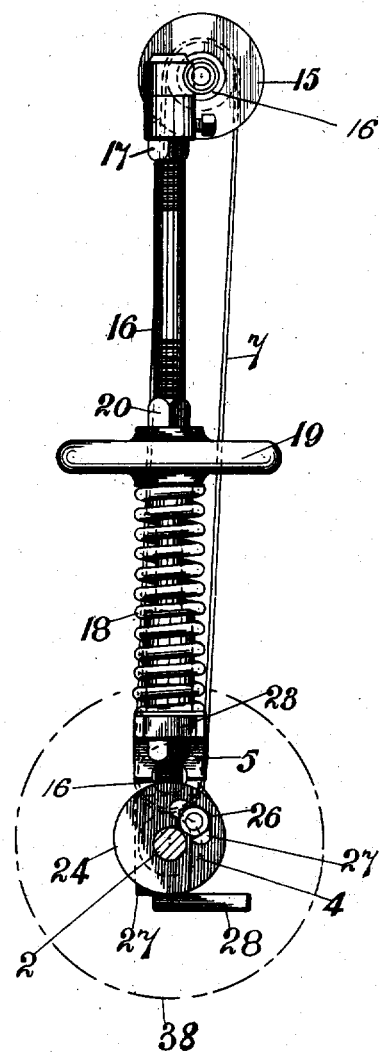
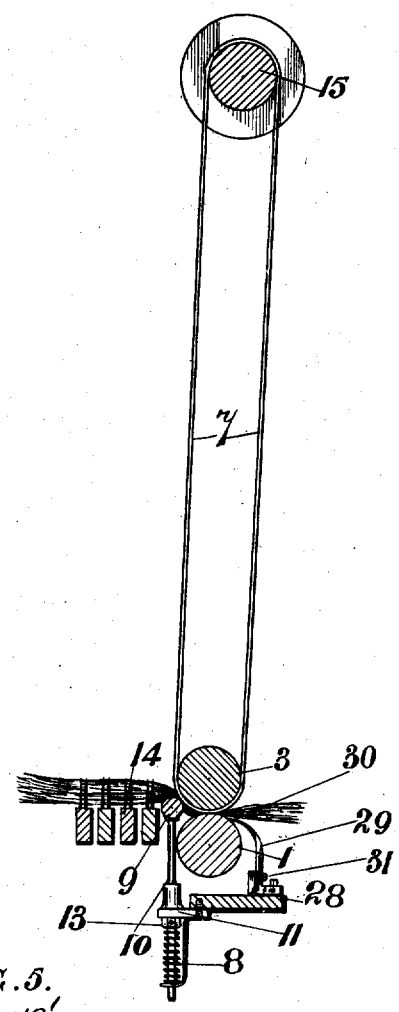
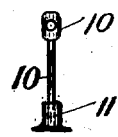
Witnesses: Inventor,
Geo C Boulton William Holdsworth,
Wm H Bates by Hubert W. Jenner.
Attorney.

UNITED STATES PATENT OFFICE.

WILLIAM HOLDSWORTH, OF HALIFAX, ENGLAND.

GILL-BOX AND GILL-DRAWING FRAME.

No. 890,054.  Specification of Letters Patent.  Patented June 9, 1908.

Application filed May 7, 1907. Serial No. 372,672.

*To all whom it may concern:*

Be it known that I, WILLIAM HOLDSWORTH, a subject of the King of Great Britain and Ireland, and a resident of Halifax, Yorkshire, England, have invented certain Improvements in Gill-Boxes and Gill-Drawing Frames, (for which I have obtained a patent in Great Britain, No. 22,136, bearing date October 8, 1906,) of which the following is a specification.

This invention relates to gill boxes and gill drawing frames; and it consists in the novel construction and combination of the parts hereinafter fully described and claimed.

In the drawings, Figure 1 is a front view of the apparatus. Fig. 2 is a cross-section taken through the parts 23, 27 and 28 on the line A—B in Fig. 1, and looking in the direction of the arrow. Fig. 3 is an end view of the apparatus showing the shaft 2 in section. Fig. 4 is a vertical section through the rollers of the apparatus. Fig. 5 is a detail view of one of the bearings 10'.

28 is a supporting base-plate provided with bearings 27.

2 is the main driving shaft of the apparatus which is journaled in the bearings 27, and provided with a wheel 38, or any other approved means, for revolving it.

1 is a smooth cylindrical bottom roller which is secured on the shaft 2.

24 are bearing blocks which are pivoted on the shaft 2, and 16 are side bars which are secured to the said blocks 24 at their lower ends.

16 are bearings which are adjustably secured on the screwthreaded upper end portions of the bars 16, and 17 are nuts for locking the said bearings in position. An upper roller 15 is journaled in the said bearings 16'.

23 is a crossbar, the end portions of which have holes which are slidable over the lower portions of the bars 16, and 18 are springs which press the said crossbar downwardly.

19 are wheels which are screwed on the middle parts of the bars 16 and which afford a means for adjusting the tension of the springs 18, and 20 are nuts for locking the said wheels to the said bars.

22 are bearing-blocks which are secured to the crossbar 23 and which are provided with bearing grooves 21. A lower roller 3 provided with a shaft 6 is journaled in the bearing grooves 21, and 7 is an endless apron or leather which passes over the said rollers 15 and 3, and which is pressed downwardly toward the roller 1 by the springs 18.

26 are set-screws which are slidable in curved slots 27 in the bearing-blocks 24, and which are screwed into the stationary bearings 27. The bars 16 and the parts carried by them form a frame which can be adjusted circumferentially to a limited extent about the shaft 2, and which can then be secured in position by the set-screws 26.

4 are toothed wheels which are secured on the shaft 2, and which gear into toothed wheels 5 secured on the shaft 6, so that the roller 3 is driven positively and in the opposite direction from the roller 1. The roller 1 is preferably smooth, and the roller 3 is preferably roughened, and the endless apron or leather 7 is driven by contact with the said rollers as it passes between them. The fallers 14 are arranged to one side of the rollers 1 and 3, and the material passes from the said fallers between the apron 7 and the roller 1 as shown in Fig. 4.

9 is a small licker-in roller arranged between the fallers and the roller 3. The roller 9 is journaled in bearings 10' on the upper ends of two similar standards 10 which are slidable vertically in guide brackets 11. The guide brackets 11 are secured to the base 28, and are provided with springs 8 which bear on nuts or collars 13 secured on the said standards 10, so that the roller 9 is pressed upwardly against the material.

29 is a spring scraper which is adjustably secured to the base 28 by fastening devices 31. The sharp edge of this scraper bears against the roller 1, and prevents the material from winding around it.

What I claim is:

1. The combination, with a bottom roller provided with means for revolving it, of circumferentially adjustable side-bars pivoted concentric with the said bottom roller, means for securing the said side-bars in position, an upper roller carried by the said side-bars, a slidable spring-pressed crossbar also carried by the said side-bars, a lower roller bearing in the said crossbar, and an endless apron passing over the said upper and lower rollers and operating to press the material against the said bottom roller.

2. The combination, with a bottom roller provided with means for revolving it, of circumferentially adjustable side-bars pivoted concentric with the said roller, means for securing the said side-bars in position, a slidable spring-pressed crossbar carried by the said side-bars, a lower roller bearing in the said crossbar, toothed driving wheels operatively connecting the said lower roller with the said bottom roller, and an endless apron passing over the said upper and lower rollers and operating to press the material against the said bottom roller.

3. The combination, with a base provided with stationary bearings, of a shaft journaled in the said bearings and provided with means for revolving it, a bottom roller secured on the said shaft, a circumferentially adjustable frame pivoted on the said shaft and provided with means for securing it to the said bearings, a pair of rollers journaled in the said frame, and an endless apron passing over the said pair of rollers and operating to press the material against the said bottom roller.

4. The combination, with a stationary support, and a bottom roller journaled therein and provided with means for revolving it; of a pivoted frame which is adjustable circumferentially of the said bottom roller, a pair of rollers bearing in the said frame, and an endless apron carried by the said pair of rollers and operating to press the material against the said bottom roller.

5. The combination, with a stationary support, and a bottom roller journaled therein and provided with means for revolving it; of a pivoted frame which is adjustable circumferentially of the said bottom roller, a pair of rollers bearing in the said frame, an endless apron carried by the said pair of rollers and operating to press the material against the said bottom roller, fallers arranged to one side of the said bottom roller, and a spring-pressed licker-in roller arranged intermediate of the said fallers and the said apron or leather.

6. The combination, with a stationary support, and a bottom roller journaled therein and provided with means for revolving it; of a pivoted frame which is adjustable circumferentially of the said bottom roller, a pair of rollers bearing in the said frame, an endless apron carried by the said pair of rollers and operating to press the material against the said bottom roller, and a scraper which bears on the said bottom roller.

In witness whereof I have hereunto set my hand in presence of two witnesses:

WILLIAM HOLDSWORTH.

Witnesses:
    J. B. HOWARD,
    L. WARDLE.